US008783580B2

(12) United States Patent
Lesur

(10) Patent No.: US 8,783,580 B2
(45) Date of Patent: Jul. 22, 2014

(54) PERSONALISED SUPPORT SUCH AS AN IDENTITY CARD COMPRISING ANTI-FALSIFICATION MEANS

(75) Inventor: Jean-Luc Lesur, Bras (FR)

(73) Assignee: Gemalto SA, Meudon (FR)

( * ) Notice: Subject to any disclaimer, the term of this patent is extended or adjusted under 35 U.S.C. 154(b) by 991 days.

(21) Appl. No.: 12/066,211

(22) PCT Filed: Sep. 5, 2006

(86) PCT No.: PCT/EP2006/066040
§ 371 (c)(1), (2), (4) Date: Aug. 8, 2008

(87) PCT Pub. No.: WO2007/028797
PCT Pub. Date: Mar. 15, 2007

(65) Prior Publication Data

US 2008/0308642 A1 Dec. 18, 2008

(30) Foreign Application Priority Data

Sep. 7, 2005 (FR) .................................... 05 09116

(51) Int. Cl.
*G06K 19/06* (2006.01)

(52) U.S. Cl.
USPC .......................................................... 235/494

(58) Field of Classification Search
USPC .......................................................... 235/494
See application file for complete search history.

(56) References Cited

U.S. PATENT DOCUMENTS

| | | | | | |
|---|---|---|---|---|---|
| 4,109,047 | A | * | 8/1978 | Fredrickson | 503/205 |
| 4,544,181 | A | | 10/1985 | Maurer et al. | |
| 4,597,592 | A | * | 7/1986 | Maurer et al. | 283/75 |
| 4,629,215 | A | | 12/1986 | Maurer et al. | |
| 4,735,670 | A | * | 4/1988 | Maurer et al. | 156/272.8 |
| 5,380,044 | A | | 1/1995 | Aitkens et al. | |
| 5,421,619 | A | | 6/1995 | Dyballl | |
| 5,433,807 | A | * | 7/1995 | Heckenkamp et al. | 156/230 |
| 5,570,124 | A | * | 10/1996 | Ohno et al. | 347/221 |
| 2003/0107639 | A1 | * | 6/2003 | Field | 347/105 |
| 2005/0095408 | A1 | * | 5/2005 | LaBrec et al. | 428/195.1 |
| 2005/0258634 | A1 | * | 11/2005 | Dronzek, Jr. | 283/72 |

FOREIGN PATENT DOCUMENTS

| | | | |
|---|---|---|---|
| FR | 2 449 930 | A1 | 9/1980 |
| FR | 2 496 938 | A1 | 6/1982 |
| GB | 2 132 136 | A | 7/1984 |
| WO | WO 00/78556 | A1 | 12/2000 |

OTHER PUBLICATIONS

Form PCT/ISA/210 (International Search Report) dated Nov. 28, 2006.
Form PCT/ISA/237 (Written Opinion of the International Searching Authority) dated Nov. 28, 2006.

* cited by examiner

*Primary Examiner* — Michael G Lee
*Assistant Examiner* — David Tardif
(74) *Attorney, Agent, or Firm* — Buchanan Ingersoll & Rooney P.C.

(57) ABSTRACT

The invention concerns a support having a surface provided with personalizing data and including anti-counterfeit measures, arranged on at least part of the surface. The anti-counterfeit measures are configured to be modified in appearance under the effect of an additional personalization of the surface part and appear as defects visible at the surface of the card.

6 Claims, 2 Drawing Sheets

PERSONALISED SUPPORT SUCH AS AN IDENTITY CARD COMPRISING ANTI-FALSIFICATION MEANS

BACKGROUND OF THE INVENTION

The present invention relates to a support comprising one face provided with personalisation means, this information being applied by means of at least one graphic personalisation means, for example such as laser, inkjet or D2T2 (Dye Diffusion Thermal Transfer), support personalisation techniques which are well known to those skilled in the art in the relevant field.

FIGS. 1 and 2 show a support 1 of the aforementioned type, for example an identity card. The card 1 includes a card body 2, made of an opaque plastic material, capable of being personalised by the aforementioned means, for example such as polycarbonate, PET or PVC. The card body 2 is designed so as to be provided on its top face 3 with personalisation information 4 and 4*bis* of the card.

Generally speaking and by way of example, the personalisation information applied to the card body 2 includes, in reference to FIG. 2, a photographic representation 6 of the card holder and alphanumerical characters 7 relating to the holder's identity and address. The personalisation information can, for example, be inscribed on the surface 3 of the card body by means of a laser beam, burning the surface of the card body. Such a personalisation is illustrated by reference 4 in FIG. 1. The resulting local discoloration of the surface depends on the energy available, the inscription time and the material used for the card body.

The personalisation information can also be applied to the surface of the card body by personalisation means such as inkjet or D2T2, as depicted by reference 4*bis*. Different types of personalisation information obtained by the various aforementioned personalisation means can coexist on the same card.

A transparent protective layer 5 can be affixed to the top face of the card body by means of an adhesive coating with a view to protecting the photo or the personalisation text of the card.

These personalised supports are increasingly being used, for example, as identity cards. Due to their intensive use and to the sensitive nature of identity controls, they must be designed such as to be protected against any attempt to tamper with or falsify them, with the highest possible degree of security.

And yet, the numerous types of personalised supports currently available do not fulfil this condition. In particular, supports in which personalisation is carried out using a controlled laser beam can be easily falsified by anyone having the minimum technical skills required, performing a new laser personalisation operation to skillfully write over the first personalisation so as, for example, to add one or more characters to the name or address, or even so as to doctor the photograph, for example by adding hair. Considering the precision provided by laser personalisation technology, it is possible to circulate falsified cards which are very difficult to detect by simple visual examination.

This problem of falsification of a personalised support, for example by writing over the existing personalisation using the same graphic personalisation means as initially used, has been more particularly described in the context of laser personalisation. Indeed, this context is very favourable for falsification operations, due to the extreme precision that can be obtained in a laser personalisation operation. However, supports that are personalised by implementing other graphic support personalisation technologies such as, for example, D2T2 technology, which consists of printing by thermal sublimation, or inkjet printing technology, are no more protected against falsification attempts that aim to write over the personalisation information they contain.

The invention therefore aims to solve these disadvantages.

SUMMARY OF THE INVENTION

With this aim in mind, the invention relates to a support comprising one face provided with personalisation means, characterised in that it comprises anti-falsification means arranged on at least one part of said face, said anti-falsification means being designed to modify their appearance in the event of additional personalisation of said part and to appear in the form of visible defects on the surface of the card.

Said anti-falsification means are advantageously invisible.

According to one embodiment, said anti-falsification means comprise a laser-inscribed graphic printing pattern.

According to another embodiment, said anti-falsification means comprise a graphic printing pattern inscribed using an ink that reacts to the personalisation means used.

According to either one of these embodiments, said graphic printing pattern includes fine lines, a series of points, text or a logo.

According to a further embodiment, said anti-falsification means include a mask made of a material that reacts to the personalisation means used.

The invention also relates to a method for manufacturing a support comprising a personalisation step during which the personalisation information is applied to one face of the support by means of at least one support personalisation means, said method being characterised in that it includes a securitisation step consisting of applying anti-falsification means on at least one part of said face, said anti-falsification means being designed to modify their appearance in the event of additional personalisation of said part and to appear in the form of visible defects on the surface of the card.

The personalisation step is preferably performed using personalisation means such as a laser beam and/or personalisation means such as inkjet printing and/or personalisation means such as D2T2.

According to one embodiment, the securitisation step is performed before the personalisation step and consists of arranging the anti-falsification means in the form of a graphic printing pattern made with ink that reacts to the personalisation means used.

According to another embodiment, the securitisation step is performed after the personalisation step and consists of arranging the anti-falsification means in the form of a graphic printing pattern made with a laser bean.

According to another embodiment, the securitisation step is performed, on the one hand, before the personalisation step by arranging anti-falsification means in the form of a first graphic printing pattern made with ink that reacts to the personalisation means used and, on the other hand, after the personalisation step by arranging anti-falsification means in the form of a second graphic printing pattern made with a laser beam.

The anti-falsification means made by means of a laser beam are advantageously arranged in a random fashion on the face of the support.

According to another embodiment, the securitisation step is performed after the personalisation step and consists of arranging the anti-falsification means in the form of a mask made of a material that reacts to the personalisation means used.

Said anti-falsification means are advantageously arranged in an invisible manner.

BRIEF DESCRIPTION OF THE DRAWINGS

Further characteristics and advantages of the present invention will appear more clearly from reading the following description provided as an illustrative example in a non-limiting manner and made in reference to the appended figures, wherein.

DETAILED DESCRIPTION

Figure 1:
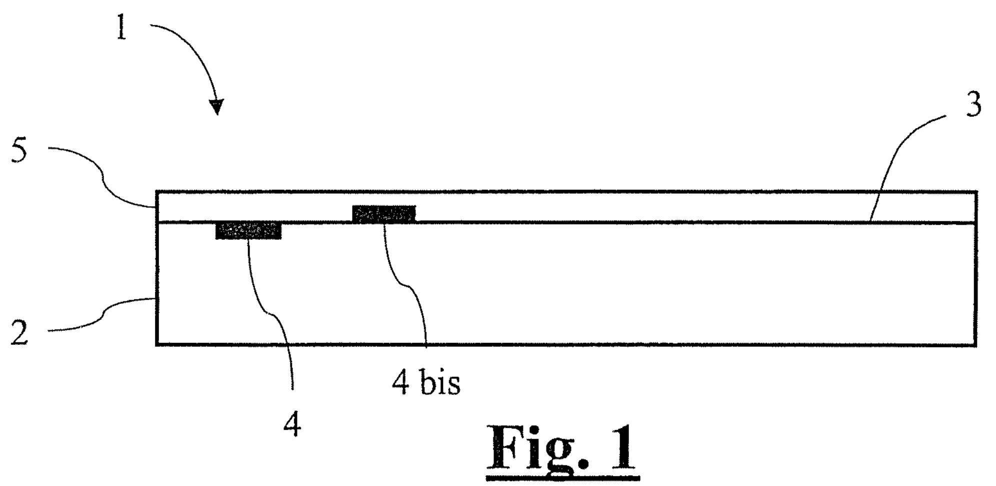
FIG. 1 is a diagrammatic section view of a personalised support, such as an identity card, and has already been described.
Figure 2:
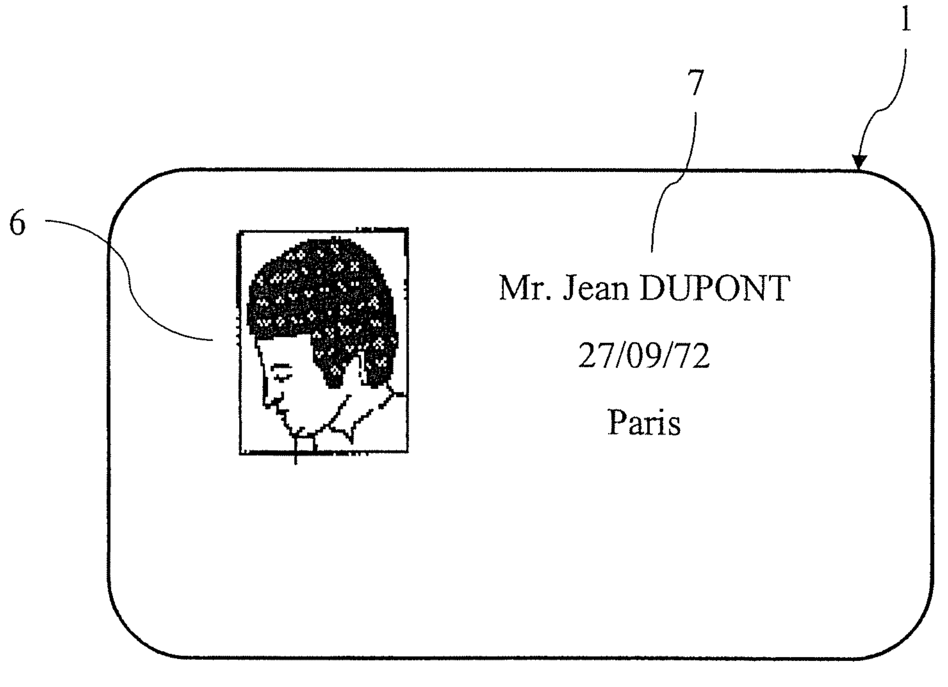
FIG. 2 is an outline sketch diagrammatically showing the personalisation information contained in the card in FIG. 1, which has already been described.
Figure 3A:
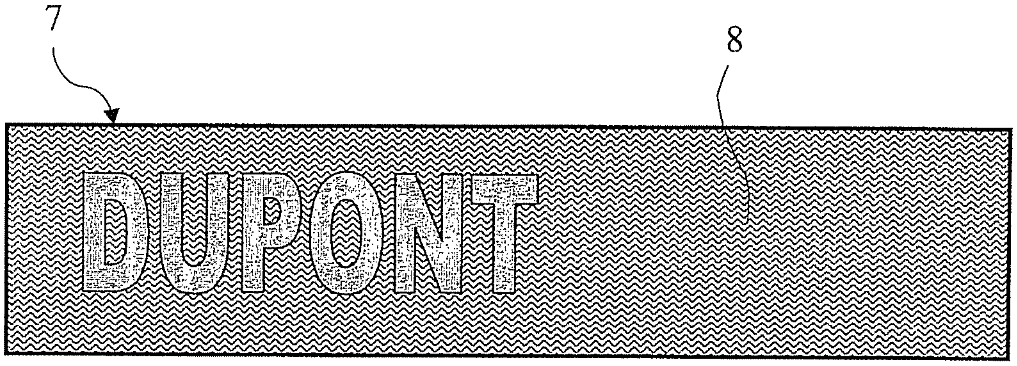
FIGS. 3*a* to 3*c* show a detail view of the surface of a personalised support made according to the present invention and the effects produced by the invention in the event of a falsification attempt.

A personalised support, for example in the form of a card, made according to the indications of the invention and which is furthermore of the same type as that already described in reference to FIGS. 1 and 2, comprises specific anti-falsification means 8 such as shown in FIG. 3*a*. These anti-falsification means 8 therefore have the aim of preventing the falsification of a personalised support by writing over the existing personalisation.

FIG. 3*a* shows, more particularly, a detail of the surface of the card body containing the identity details 7 of the card holder. According to the invention, the anti-falsification means include a graphic printing pattern 8 inscribed on at least one part of the card body surface. The graphic printing pattern can advantageously be provided so as to be invisible, therefore being difficult to detect by simple visual examination. For this purpose, the graphic printing pattern can be made invisible by being embedded in the personalisation or near it or in the background of the card (also known as "artwork"). The graphic printing pattern can also be transparent.

According to the example of FIG. 3*a*, the graphic printing pattern 8 is inscribed in an invisible manner (although deliberately shown in a visible manner in FIG. 3*a* in order to facilitate its understanding) on the entire part of the surface of the card body where no personalisation information is inscribed.

The graphic printing pattern 8 acting as anti-falsification means can, in an alternative embodiment, only be applied to one part of the surface of the card body corresponding to the areas that contain no personalisation information. Thus, it can advantageously be arranged essentially in sensitive areas of the card, which is to say in the areas that are most likely to be falsified by writing over the existing personalisation, for example around the photographic representation 6 (in the form of sensitive lines marking the head contour) or the personalisation details 7.

In a general manner, the anti-falsification means 8 are provided so as to be arranged in places where it is desirable to avoid fraudulent personalisation by overwriting, on all or part of the support.

The invention is based on the principle that the graphic printing pattern 8 is designed to react with the support personalisation means used, for example with the laser beam in the case of laser personalisation, so that it reveals itself by changing appearance and thus by modifying the external appearance of the support in the event of attempted falsification of the support at the points where the pattern is present.

It is also foreseeable to combine several anti-falsification patterns 8 on the same card, which would each reveal itself by reacting to different graphic personalisation means—laser, inkjet or D2T2—in the case of these different means being used to personalise the card.

The pattern 8 includes, according to the example of FIG. 3*a*, fine wavy lines, also known as guilloches, but can also draw a series of points, text or a logo, while conserving the same characteristics as described above, which is to say that it is inscribed on all or part of the surface of the card, preferably at sensitive points of the card, and that it reacts to the personalisation means used, so as to change appearance and modify the appearance of the support, acting as anti-falsification means in the event of writing over the existing personalisation of the support.

Figure 3B:
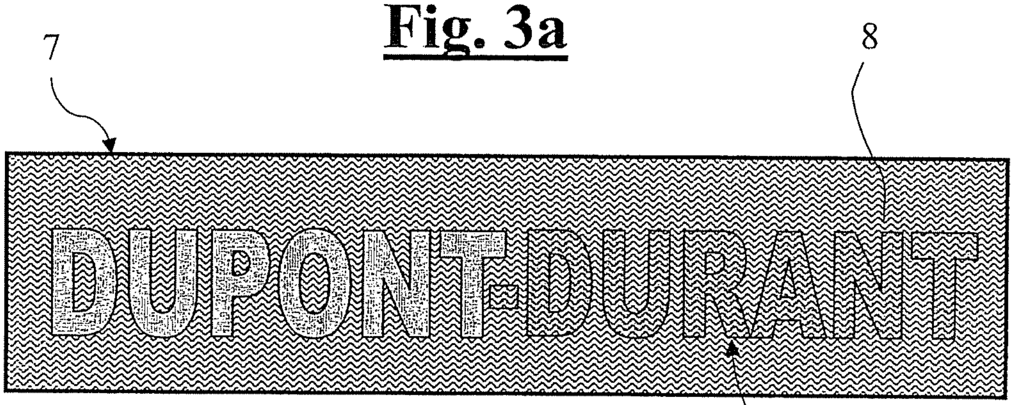
Figure 3C:
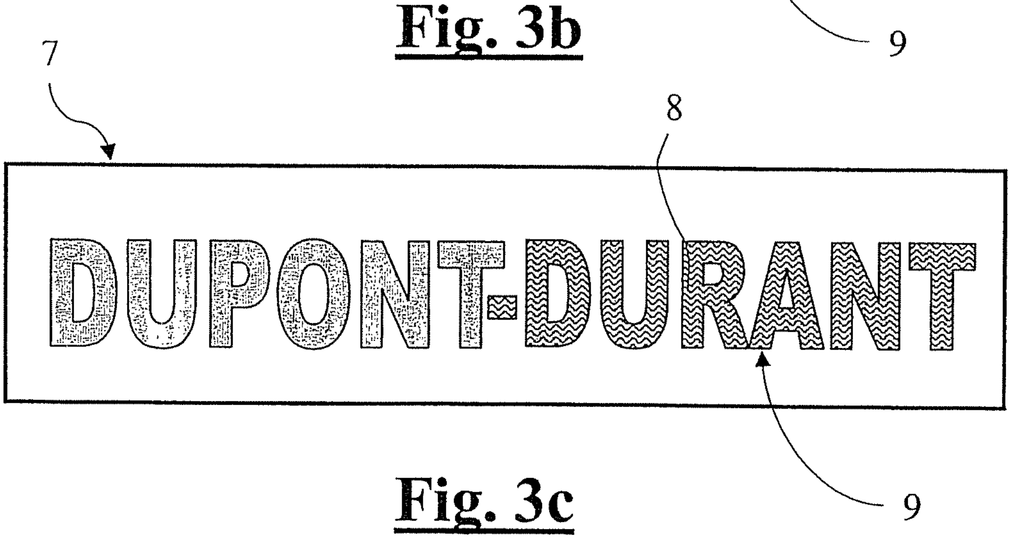

To illustrate this principle, FIG. 3*b* shows an attempt to falsify 9 the card by overwriting, which consists of modifying the original identity of the card holder by adding characters, in this case, according to the example in FIG. 3*b*, by adding the patronymic "Durant". As shown in FIG. 3*c*, the fraudulent personalisation 9 performed reveals the previously invisible wavy lines 8 at the points where the characters were added using given personalisation means. Consequently, according to the invention, any attempt to falsify the card by writing over the existing personalisation will appear in the form of visible defects on the surface of the card, said defects thus being instantly detectable by a simple visual examination of the card personalisation elements.

A first embodiment of the anti-falsification means 8 is presented next in relation with card personalisation technology using a laser beam. According to this embodiment, the laser personalisation step of the card is first of all performed in the standard manner, then a securitisation step according to the invention is implemented, consisting of adding the anti-falsification means 8 to the desired points on the surface of the card body, for example around the photographic representation and around the personalisation details. The anti-falsification graphic printing pattern is, for example, added by a laser beam to the surface of the card body, in the form of fine wavy lines, such as shown in FIG. 3*a*, each having a thickness of around 100 to 200 micrometers. It should, however, be noted, that the lines that make up the anti-falsification graphic printing pattern are not necessarily fine. They can also be thick. The important point is for them to be added to the surface of the card body by means of the laser beam with low enough energy to ensure that the lines or other patterns do not appear.

In this way, the anti-falsification means are difficult to detect by the untrained eye performing a simple visual examination of the personalised support. In addition, according to this embodiment, the anti-falsification means of the card can be adjusted so as to be very similar to the personalisation elements to be protected, thanks to the precision offered by the laser.

Afterwards, if fraudulent overwriting attempts are made using laser around the existing personalisation, the previously formed anti-falsification pattern will become apparent at the overwritten points, as shown in FIG. 3*c*, since the overload of energy received on the pattern exceeds an energy threshold required to become visible to the naked eye.

Advantageously, with a view to increasing anti-fraud protection, the anti-falsification means 8 can be arranged in a random manner on the body of the card, meaning that they are not arranged in an identical manner from one card to the next.

Thus, the prior detection by an ill-intentioned person of the position of the anti-falsification means after performing a personalisation test on one card is not applicable to other cards.

According to another embodiment, the securitisation step according to the invention, consisting of arranging the anti-falsification means 8 on all or part of the personalisable face of the card body at sensitive points, normally intended to be free from personalisation information, can be carried out prior to the actual personalisation step of the card. According to this embodiment, the anti-falsification means 8 are applied during the offset printing phase of the card dummy and include a graphic printing pattern made with ink that has the characteristic of being sensitive to the personalisation means used, for example to laser. The ink used is advantageously transparent or has a colour that can be confused with the artwork of the card, so that the pattern becomes invisible. In this way, the ink reacts to the laser beam and changes appearance, for example becoming visible, creating an overthickness on the surface of the card body or peeling off the protective layer affixed to the card body.

Examples of ink capable of providing this type of reaction to laser include Flash Dry Aqualess Black Eva 019032001 or SICPA Opaque White Sicura Plast 770 12GA313770B02M.

The anti-falsification graphic printing pattern obtained according to this embodiment can, for example, include fine wavy lines as described above, intended to be arranged, for example, on the entire surface of the card. According to this embodiment, the phase of card personalisation carried out by laser, for example, is made more complex, as it would be advisable to avoid the fine lines of reactive ink previously applied to the support with the laser beam used to personalise the card. In this way, the fine lines are visible at the points where the personalisation elements were applied and invisible at the points where no personalisation elements were applied. Thus, to increase the security, it is possible to provide different configurations in which the fine lines thus arranged prior to the personalisation step are combined with other anti-falsification means made by laser in a manner that varies according to the card, after the personalisation step according to the first embodiment.

This embodiment, more specifically described in reference to a laser personalisation can also be advantageously implemented for detecting falsification attempts in the context of inkjet personalisation. Indeed, the quality of the result of an inkjet card personalisation depends on the type of ink used and on the characteristics of the support and, in particular, on its surface tension. Thus, if the surface tension is modified at certain points of the support, the quality of the printing is affected. The anti-falsification means using reactive ink previously applied to the support at the desired points provide this effect and therefore make it possible to reveal falsification attempts by writing over the existing personalisation by means of inkjet printing, showing visible defects in the result of the printing. The principles set forth above for applying the invention to inkjet-type personalisation are also relevant in the context of applying the invention to D2T2-type personalisation.

Silk-screen printing ink Vernis SICPA 02S1027972 is one example of ink providing the reactivity expected of the inkjet-type personalisation means and can therefore be used to implement the anti-falsification means according to the invention in the context of inkjet personalisation. Likewise, transparent offset ink Vernis DUBUIS 0E338 is one example of ink providing the reactivity expected of the D2T2-type personalisation means and can therefore be used to implement the anti-falsification means according to the invention in the context of D2T2 personalisation.

According to another embodiment of the invention, the anti-falsification means include a screen, or mask, provided to cover all or part of the top face of the card body once the personalisation information has been inscribed on same and are made, for example, by depositing a film or a layer of specific material. According to the principles of the invention, a material that reacts to the personalisation means used is used for this purpose, designed to change appearance, thus modifying the overall appearance of the support in the event of fraudulent personalisation attempts at the points where the mask is affixed to the top face of the support.

To make the anti-falsification mask, it is possible to use, for example, materials (such as diarythelenes) which can be added to various polymers and are capable of changing colour according to a specific wavelength (for example, 355 nm for the UV laser).

According to one variation, a personalised support can be provided comprising, as anti-falsification means, the anti-falsification mask combined with other anti-falsification means arranged in the form of graphical printing patterns made by laser and/or using reactive ink, as previously described.

The invention claimed is:

1. A substrate comprising:

personalization data that is visible on a surface of said substrate, said personalization data having been implemented by using a laser beam-type personalization means; and anti-forging means comprising a laser inscribed graphic printing pattern, arranged on at least a part of said surface that is unoccupied by said personalization data, wherein said anti-forging means (i) is invisible to the naked eye and (ii) reacts with an additional personalization data on said at least part of said surface, also implemented by using a laser beam-type personalization means so that said additional personalization data exposes said anti-forging means therein on said at least part of said surface of the card.

2. The substrate according to claim 1, wherein said laser-inscribed graphic printing pattern, which is invisible to the naked eye, is generated with energy low enough to ensure that said graphic printing pattern is not visible.

3. The substrate according to claim 2, wherein said graphic printing pattern comprises fine lines, a series of points, text or a logo.

4. A process for the production of a substrate that comprises:

arranging, during a personalization stage, personalization data on a surface of the substrate by means of a laser beam-type personalization means so that said personalization data is visible on said surface;

applying, by a laser beam, during a securitization stage, an anti-forging means on at least a part of said surface that is unoccupied by said personalization data, wherein said anti-forging means (i) is invisible to the naked eye and (ii) reacts with an additional personalization data on said at least part of said surface, also implemented by using a laser beam-type personalization means so that said additional personalization data exposes said anti-forging means therein on at least part of said surface of the card.

5. The process according to claim 4, wherein the securitization stage is implemented after the personalization stage and comprises applying the anti-forging means in the form of a graphic printing pattern that is implemented by means of a laser beam with energy low enough to ensure that said graphic printing pattern is not visible.

6. The process according to claim 5, wherein the anti-forging means that is implemented by means of a laser beam is applied randomly on the face of the substrate.

* * * * *